(12) United States Patent
Nguyen (10) Patent No.: US 7,039,356 B2
(45) Date of Patent: May 2, 2006

(54) SELECTING A SET OF ANTENNAS FOR USE IN A WIRELESS COMMUNICATION SYSTEM

(75) Inventor: Hung Nguyen, Milpitas, CA (US)

(73) Assignee: Blue7 Communications, Milpitas, CA (US)

( * ) Notice: Subject to any disclaimer, the term of this patent is extended or adjusted under 35 U.S.C. 154(b) by 597 days.

(21) Appl. No.: 10/372,904

(22) Filed: Feb. 24, 2003

(65) Prior Publication Data

US 2004/0203347 A1    Oct. 14, 2004

Related U.S. Application Data

(60) Provisional application No. 60/363,530, filed on Mar. 12, 2002.

(51) Int. Cl.
*H04B 7/185* (2006.01)

(52) U.S. Cl. .................. 455/13.3; 455/525; 455/562.1

(58) Field of Classification Search .............. 455/13.3, 455/525, 562.1, 560, 561, 575.7
See application file for complete search history.

(56) References Cited

U.S. PATENT DOCUMENTS

| | | | |
|---|---|---|---|
| 5,175,878 A * | 12/1992 | Davis et al. ................. | 455/103 |
| 5,701,596 A * | 12/1997 | Meredith et al. ............ | 455/103 |
| 5,913,177 A * | 6/1999 | Meredith et al. ......... | 455/562.1 |
| 6,385,464 B1 * | 5/2002 | Narita et al. ................ | 455/561 |
| 6,546,259 B1 * | 4/2003 | Vendryes ..................... | 455/513 |
| 2001/0004604 A1 * | 6/2001 | Toshimitsu et al. ......... | 455/562 |
| 2003/0096638 A1 * | 5/2003 | Doi et al. .................... | 455/562 |
| 2004/0022205 A1 * | 2/2004 | Miyata et al. .............. | 370/319 |

* cited by examiner

*Primary Examiner*—Tilahun Gesesse
*Assistant Examiner*—Tan Trinh
(74) *Attorney, Agent, or Firm*—Squire, Sanders & Dempsey L.L.P.

(57) ABSTRACT

Mechanisms for selecting a set of antennas for use in a wireless communication system are disclosed. The selected set of antennas is for use in communicating data in a wireless local area network (WLAN) comprising an access point and a plurality of mobile stations. The access point includes a baseband chip capable of adapting various radio frequency (RF) units. Each RF unit in turns includes a plurality of RF sub units, each of which connects to a plurality of antennas. The access point thus includes a number of antennas that, together with the RF units and the baseband chip, form a smart antenna. To identify the selected set of antennas to communicate with a particular mobile station, the access point initially uses a first set of antennas each in a RF sub unit. From this first set of antennas, the access point identifies a first set of winner antennas and a first set of non-winner antennas. From the first set of winner antennas, the access point identifies a first set of winner RF sub units each connecting to a winner antenna in the first set of winner antennas. From each winner RF sub unit, the access point identifies a final winner. The access point then uses the final winner antenna in the selected set of antennas. The access point also uses the first set of non-winner antennas in the selected set of antennas.

14 Claims, 11 Drawing Sheets

SELECTING A SET OF ANTENNAS FOR USE IN A WIRELESS COMMUNICATION SYSTEM

RELATED APPLICATIONS

This application incorporates by reference co-pending patent application Ser. No. 10/079,751, entitled "Transferring Data In A Wireless Communication System," by the same inventor and applicant Hung Nguyen, filed Feb. 22, 2002.

This application claims benefits of provisional application Ser. No. 60/363,530, entitled "Selecting A Set Of Antennas For Use In A Wireless Communication System," by the same inventor and applicant Hung Nguyen, filed Mar. 12, 2002.

FIELD OF THE INVENTION

The present invention relates generally to wireless communication systems, and more specifically to selecting a set of antennas for use in such systems.

BACKGROUND OF THE INVENTION

Antennas are commonly used in wireless communication systems in which the antennas radiate power for signals to be received and transmitted through the antennas to appropriate signal transmitters and receivers. Adaptive antennas refer to an array of antennas capable of dynamically changing the antenna pattern to adjust to noise, interference, and different paths of users using the antenna, etc. Adaptive antennas form beams for transmission and enhance signals because they can adjust their patterns to track mobile users. Switched beam technologies use a number of beams at an antenna site for the receiver to select the beam that provides the best signals. Smart-antenna systems usually include both adaptive antennas and switched beam technologies. The number of antennas in an array for use in adaptive antennas and/or smart antennas varies depending on the applications using the antennas, the distance between the wireless transmitters and receivers, whether the system processing the wireless signals are powerful or not, etc. However, in general, the more antennas are used in a system, the better it is for the system's reception and transmission performance. Unfortunately, as the number of antennas increases, transferring the data through the antennas becomes more difficult and expensive because adding antennas to a system results in additional components and costs to the system. For example, in various cases, additional radio-frequency (RF) data paths must be added, and, as the number of these paths increases, the interface between the paths and the baseband chip becomes more complicated. Additionally, the system performance varies depending on various factors including the set of antennas selected for communications between the mobile station and the access point. Therefore, what is needed is mechanisms to solve the above problems and related issues.

SUMMARY OF THE INVENTION

The present invention, illustrated in various embodiments, provides mechanisms for selecting a set of antennas for use in a wireless communication system. In one exemplary embodiment, the selected set of antennas is for use in communicating data in a wireless local area network (WLAN) comprising an access point and a plurality of mobile stations. The access point includes a baseband chip capable of adapting various radio frequency (RF) units. Each RF unit in turns includes a plurality of RF sub units, each of which connects to a plurality of antennas. The access point thus includes a number of antennas that, together with the RF units and the baseband chip, form a smart antenna.

In one embodiment, to select a set of antennas to communicate with a particular mobile station, the access point initially uses a preliminary set of antennas each in a RF sub unit. From this preliminary set of antennas, the access point identifies a preliminary set of winner antennas and a set of non-winner antennas. From the preliminary set of winner antennas, the access point identifies a set of winner RF sub units each including a preliminary winner antenna in the preliminary set of winner antennas. From each winner RF sub unit, the access point identifies a final winner antenna. The access point then uses the final antenna in each of the winner RF sub unit in the selected set of antennas. In one embodiment, the access point also uses the first set of non-winner antennas in the selected set of antennas.

In one embodiment, the access point also identifies a preliminary set of winner adaptive weights and a set of non-winner weights. Each preliminary winner adaptive weigh corresponds to a preliminary winner antenna in the preliminary set of winner antennas while each non-winner adaptive weight corresponds to an antenna in the set of non-winner antennas. A winner weight, in one embodiment, is a weight having an amplitude higher than a pre-defined threshold.

DETAILED DESCRIPTION OF THE INVENTION

System Overview

Figure 1:
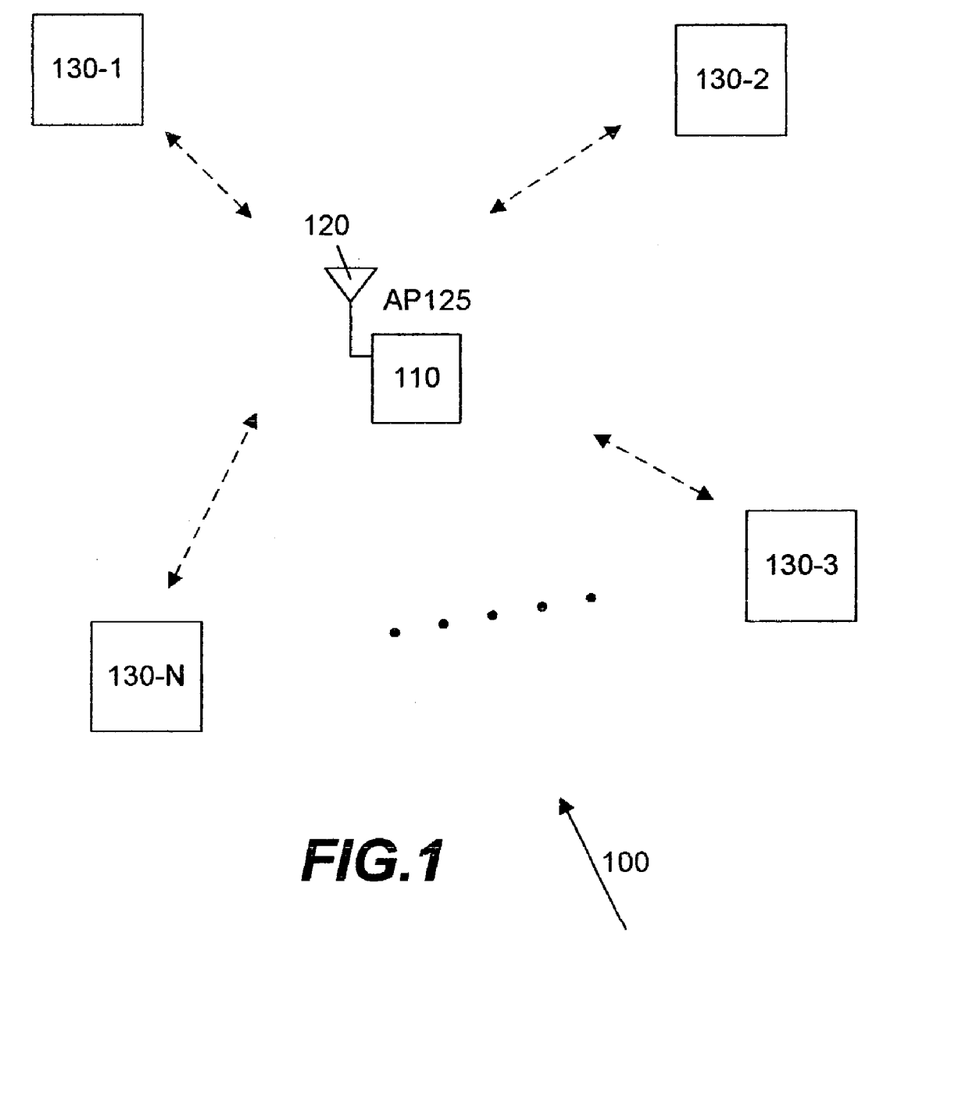
FIG. 1 shows a wireless communication system upon which embodiments of the invention may be implemented.

FIG. 1 shows a wireless communication system 100 upon which embodiments of the invention may be implemented. Exemplary technologies used in system 100 includes the code-division multiple access (CDMA), the time-division multiple access (TDMA), the global system for mobile communications (GSM), etc. System 100 includes an access point 125 and a plurality of stations 130(1), 130(2), ..., 130(N). Access point 125 includes an access station 110 connected to a smart antenna 120. In one embodiment, access point 125 is connected to an electronic network (not shown), which transmits information through access station 110, smart antenna 120, and wirelessly to stations 130. Similarly, the network wirelessly receives information from stations 130 through smart antenna 120 and access station 110, etc. Generally, access station 110 processes signals received or sent through antenna 120. To improve reception and transmission performance of a particular station 130, access point 125 allows signal beams radiating through antenna 120 to be focused to that station 130.

In one embodiment, a local area network (LAN) is used as the network in the above discussion. However, the invention is not limited to LANs, other networks are within the scope of the invention, including, for example, the digital subscriber line (DSL), the Ethernet, the cable modem, etc. LAN is a computer network that spans a relatively small area. Most LANs are confined to a single building or a group of buildings.

Normally, a station 130 is a mobile device wirelessly communicating with the network through access point 125. Examples of a station 130 include a laptop or a desktop computer, a personal digital assistance (PDA), a cellular phone, etc. Each station 130 includes at least one antenna and a processing unit processing signals to communicate wirelessly with access point 125. The processing unit may be different from access station 110, but, in general, perform the same function as access station 110. Even though stations 130 are moveable from one position to another position, to communicate effectively with access point 125, a station 130 must be within the coverage range of access point 125. This coverage range varies depending on various factors including the transmitting frequency, the number of antennas in smart antenna 120 or in stations 130, the power of each antenna, the processing power of access station 110 and of the processing unit in stations 130, etc. In general, a lower-frequency system has a wider range of coverage than a higher-frequency system. For example, a system with the IEEE 802.11b or 802.11g protocol has a coverage area four times greater than that of the 802.11a protocol because the 802.11b and 802.11 g protocol operates at a 2.4 Ghz frequency, which is much slower than the 5.0 Ghz frequency of the 802.11a protocol. Those skilled in the art will recognize that IEEE stands for the "Institute of Electrical and Electronics Engineers."

The Access Point

Figure 2:
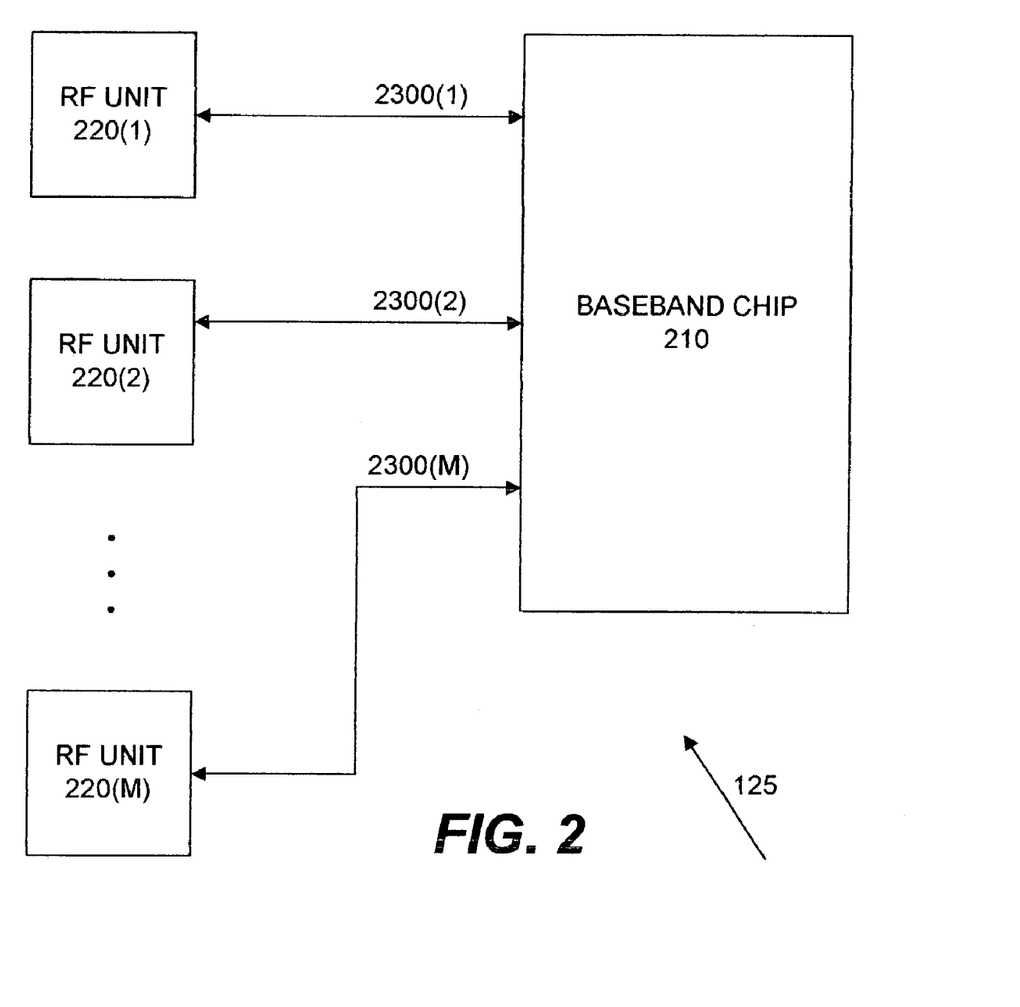
FIG. 2 shows an access point in accordance with one embodiment.

FIG. 2 shows access point 125 having a plurality of RF units 220(1) to 220(M) connected to a baseband unit or baseband chip 210 at lines 2300(1) to 2300(M), respectively, in accordance with one embodiment. A RF unit 220 includes at least one RF sub unit 2200 (FIG. 3 below), each of which carries a plurality of antennas. The antennas of all RF sub units 2200, together with RF sub units 2200 and baseband chip 210, function as smart antenna 120. Depending on implementations, RF sub units 2200 in a unit 220 may connect in parallel, in series, or in a combination of parallel and series. One embodiment of RF unit 220 is disclosed in the above co-pending patent application in which a plurality of sub units 2200 is connected in series before being connected to baseband chip 210. In an alternative embodiment, each RF sub unit 2200 is connected directly to baseband chip 210. A line 2300 thus may include one or a plurality of lines to carry data from RF sub units 2200 to baseband chip 210. The present invention is not limited to how the RF sub units are connected to each other or to baseband chip 210.

In the receiving mode, RF units 220 process the analog radio frequency signals received from smart antenna 120, down-convert the radio frequency to the intermediate frequency, combine and digitize the signals, etc. In the same receiving mode, baseband chip 210 demodulates the digitized signals received from RF units 220, converts them to the digital domain of zeros and ones, and send them to the LAN, etc. In the transmitting mode, baseband chip 210 receives the digital data from the LAN, modulates the data, and sends it to RF units 220. RF units 220, upon receiving the digital data, convert it to analog, up-convert the data's intermediate frequency to the radio frequency, and send the data to smart antenna 120, which transmits the data over the air.

In one embodiment, each RF unit 220 is removably connected to baseband chip 210. That is, each unit 220 is easily removed from or attached to baseband chip 210, which can be done by any convenient mechanism. In embodiments where printed-circuit boards (PCBs) are used to implement units 220 and baseband chip 210, any mechanism for connecting PCBs is effective.

The RF Sub Unit

Figure 3:
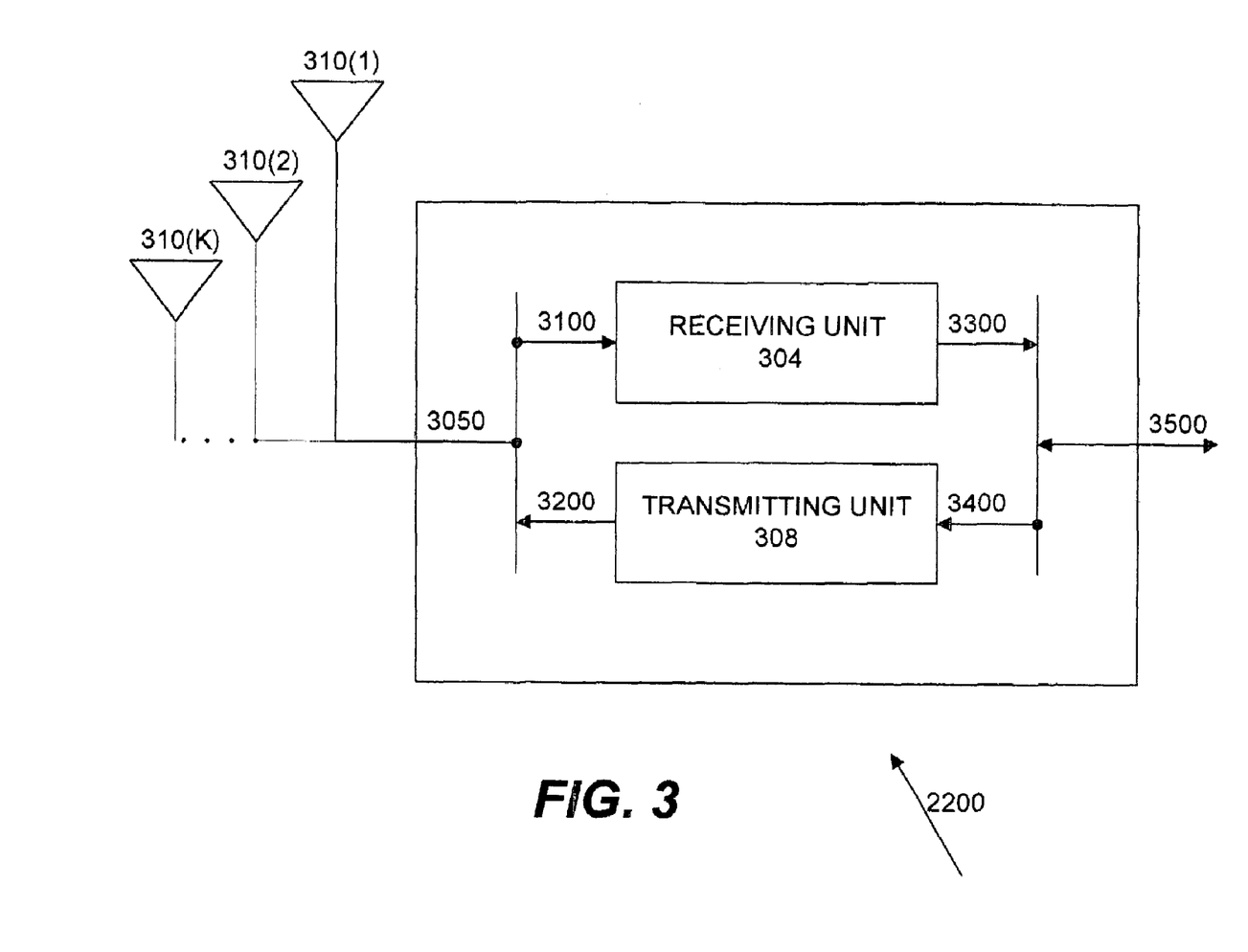
FIG. 3 shows a RF sub unit in accordance with one embodiment.

FIG. 3 shows a RF sub unit 2200 having a receiving unit 304, a transmitting unit 308, and a plurality of antennas 310(1) to 310(K), in accordance with one embodiment. Receiving unit 304 receives data from antennas 310 through line 3050 and line 3100, processes the data, and sends the processed data through line 3300 and line 3500 to baseband chip 210. Baseband chip 210 sends the data through line 3500 and line 3400 to transmitting unit 308, which processes the data, and sends the processed data through line 3200 and line 3050 to antennas 310.

Figure 4:
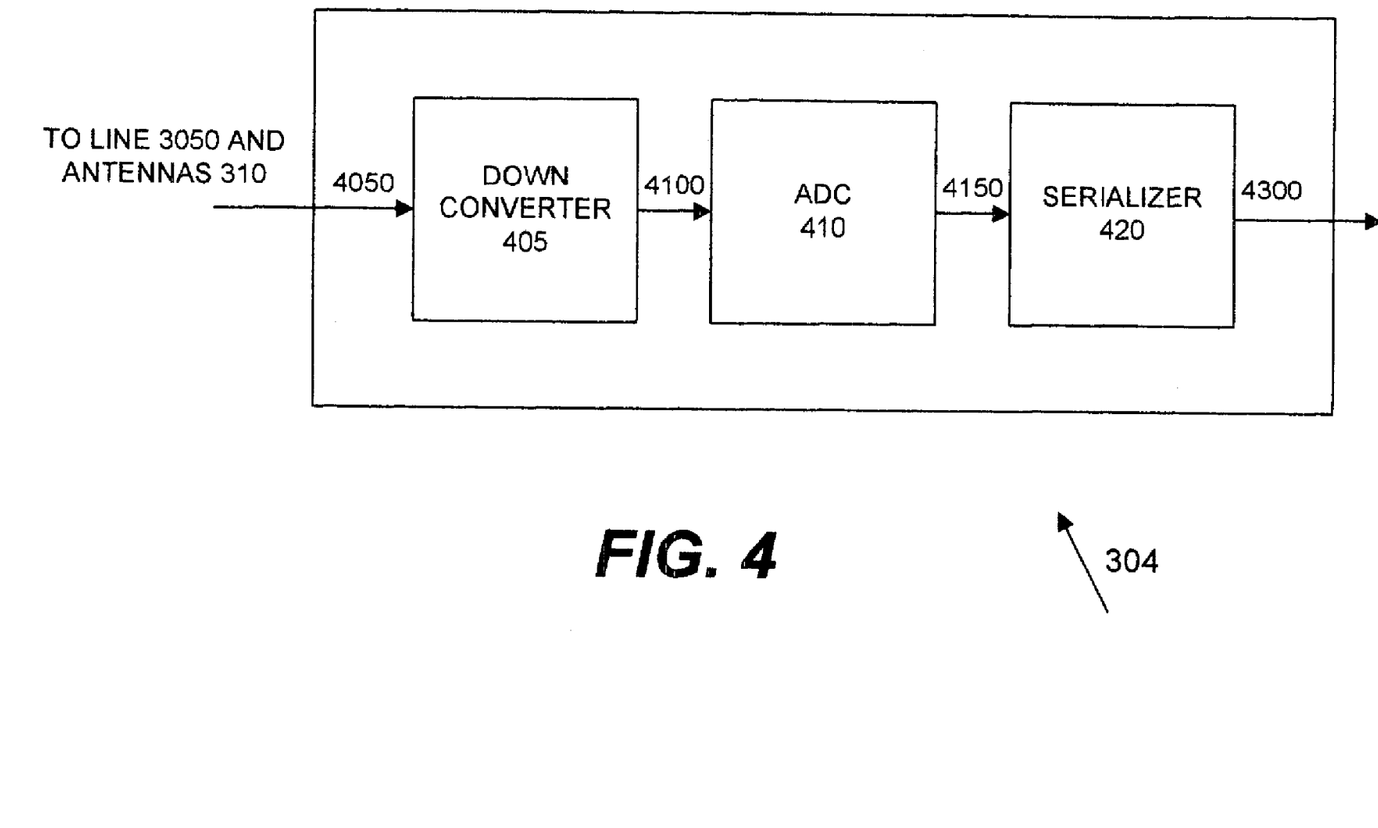
FIG. 4 shows a receiving unit in accordance with one embodiment.

FIG. 4 shows a receiving unit 304 in accordance with one embodiment. Receiving unit 304 includes a down-converter 405, an analog-to-digital converter (ADC) 410, and a serializer 420. Line 4050 corresponds to line 3100 in FIG. 3. Down-converter 405 converts the radio frequency of the signals on line 4050 to the intermediate frequency on line 4100. ADC 410 converts the data in analog form on line 4100 to digital form on line 4150. Serializer 420 converts the data on line 4150 to the data on line 4300, which corresponds to line 3300 in FIG. 3.

Figure 5:
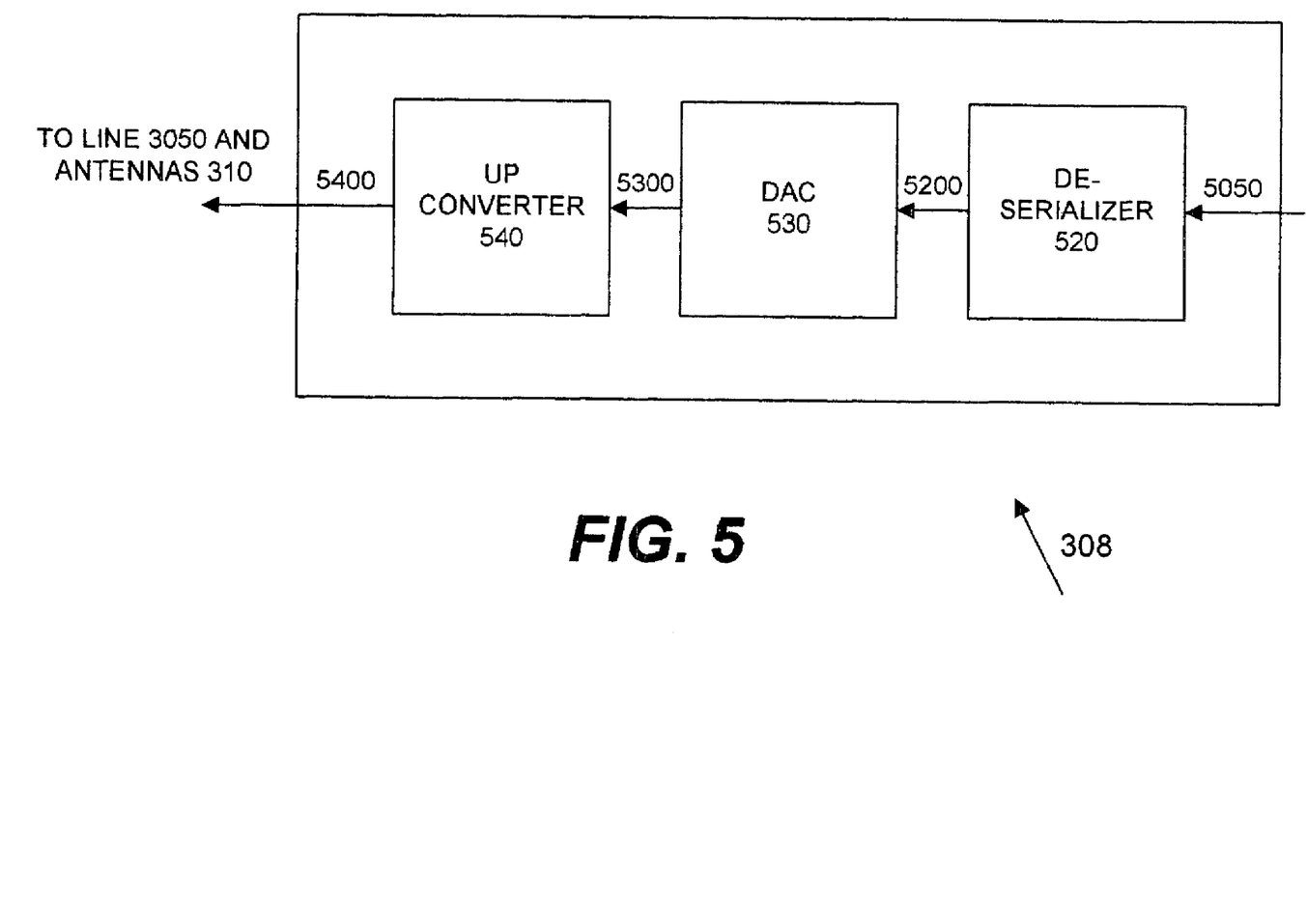
FIG. 5 shows a transmitting unit in accordance with one embodiment.

FIG. 5 shows a transmitting unit 308 of FIG. 3, in accordance with one embodiment. Transmitting unit 308 includes a de-serializer 520, a digital to analog (DAC) 530, and an up-converter 540. Line 5050 corresponds to line 3400 in FIG. 3. De-serializer 520 converts the data on line 5050 to the data on line 5200. DAC 530 converts the data in digital form on line 5200 to analog form on line 5300. Up-converter 540 converts the intermediate frequency of the data on line 5300 to the radio frequency on line 5400, which corresponds to line 3200 in FIG. 3.

The Baseband Chip

Figure 6:
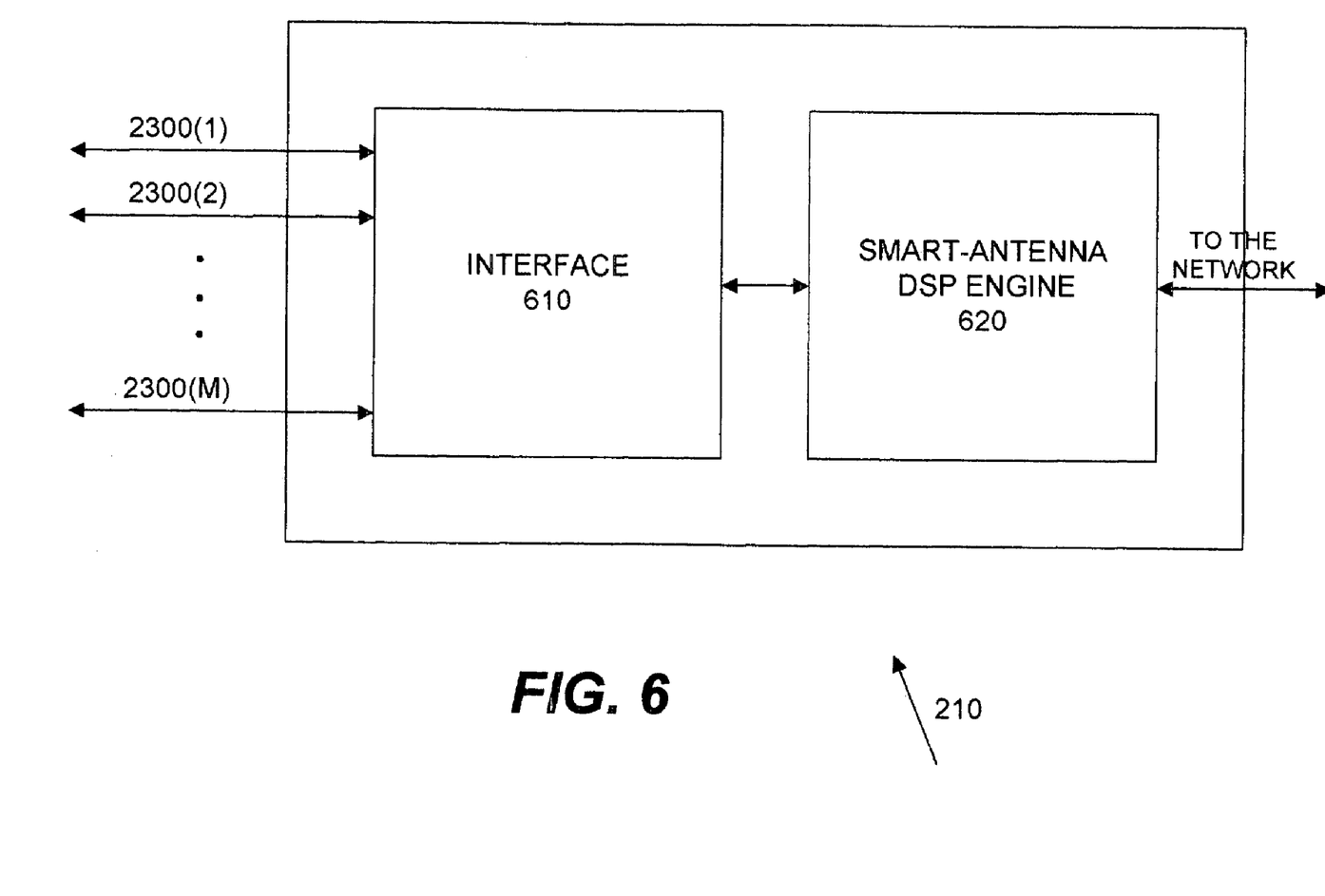
FIG. 6 shows a baseband unit in accordance with one embodiment.

FIG. 6 shows a baseband chip 210 in accordance with one embodiment. Chip 210 includes an interface 610 and a smart-antenna DSP engine 620. Interface 610 communicates with RF units 220 via each line 2300(1) to 2300(M) in FIG. 2. In one embodiment, DSP engine 620 uses the adaptive array techniques to process the data received from interface 610. For example, in the receiving mode, engine 620 processes the data received from each antenna 310 through line 2300 and interface 610, then sends the processed data to be further processed by the network layers such as the physical layer (PHY) and the media access control (MAC) layer. The data is eventually sent to the network, which in one embodiment is the LAN. Similarly, in the transmitting mode, engine 620 receives the data from the LAN via the network layers, processes the data, then sends the data to interface 610, etc.

Antenna Connections and Arrangements

Figure 7:
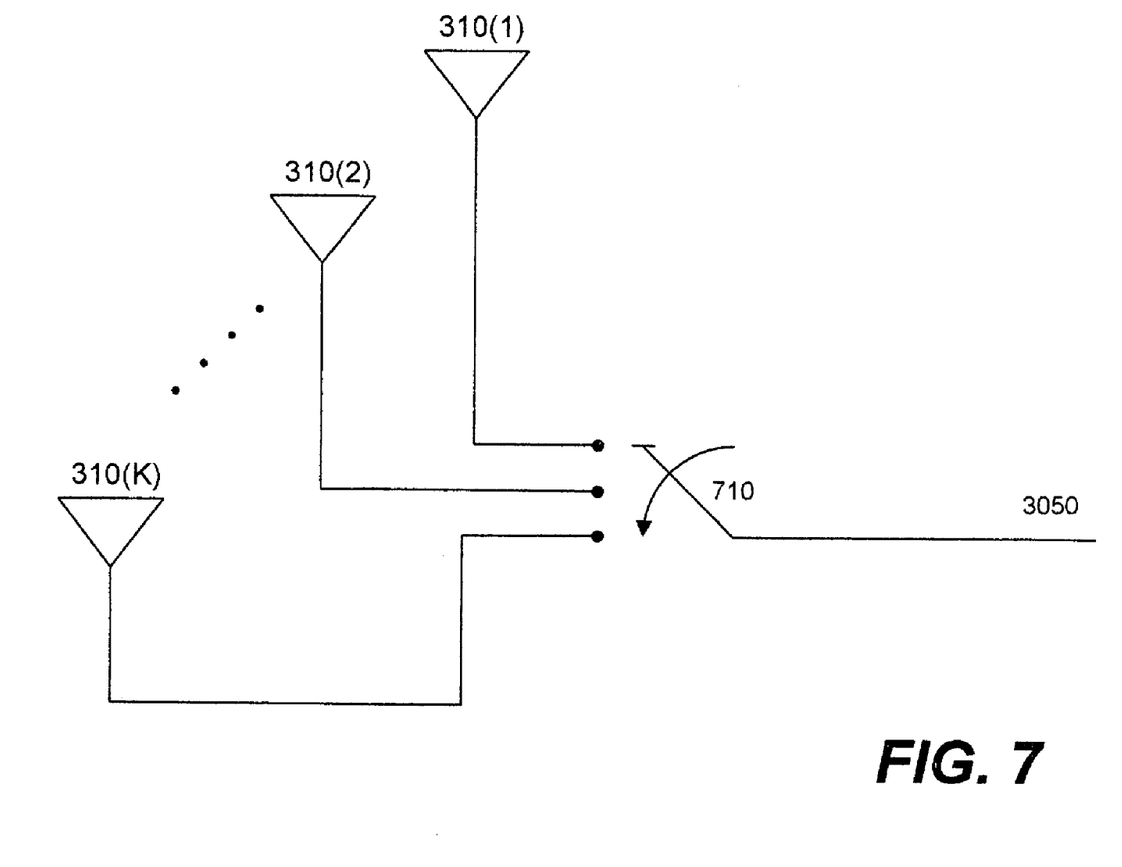
FIG. 7 shows a connection of a plurality of antennas in a RF sub unit in accordance with one embodiment.

FIG. 7 shows a connection of antennas 310(1) to 310(K) in a RF sub unit 2200, in accordance with one embodiment. In this FIG. 7, line 3050 of FIG. 3 is connected to a switch 710 for connecting line 3050 to one of the selected antenna 310 as desired. Switch 710 is used as an example, any mechanism such as a multiplexer for connecting an antenna 310 to line 3050 is effective. In one embodiment, DSP engine 620 in receiving or transmitting a data packet from a mobile station uses one antenna 310 in a RF sub unit 2200. For example, if DSP engine 620 uses antenna 310(1), then antenna 310(1) is connected via switch 710 to line 3050. If DSP engine 620 uses antenna 310(2), then antenna 310(2) is connected to line 3050; if RF DSP engine 620 uses antenna 310(I), then antenna 310(I) is connected to line 3050, etc.

In one embodiment, the distance between two adjacent antennas 310 in a RF sub unit 2200 is about ½ of the wavelength of the carrier frequency of the antenna. For example, in embodiments where the IEEE 802.11b or 802.11a protocol is used, the carrier frequency of an antenna is 2.4 GHZ and 5.0 GHZ, respectively. The wavelength is therefore about 24 cm and 12 cm, respectively; and the distance between two adjacent antennas is about 12 cm and 6 cm, respectively. The physical arrangement of all antennas 310 in a RF sub unit 2200 varies, and is not limited to a particular pattern.

Those skilled in the art will recognize that if a RF unit 220 includes only one sub unit 2200, then each sub unit 2200(1), 2200(2), 2200(3), . . . 2200(M) can be used interchangeably with a unit 220(1), 220(2), 220(3), . . . 220(M), respectively. For illustration purposes, each RF unit 220 includes one RF sub unit 2200.

The Adaptive Weight and Adaptive Algorithm

An adaptive weight or coefficient is a multiplication factor adjusting the data associated with an antenna. A higher weight results in a higher amplification of the data receiving from that antenna. Conversely, a lower weight results in a lower amplification of the data. Each time access point 125 communicates with a mobile station 130, access point 125 uses a set of antennas, e.g., antenna A(1) to antenna A(M) for M number of antennas, wherein each antenna A is selected from an antenna 310(1) to 310(K) of a RF sub unit 2200. This set of antennas A(I) to A(M) results in a set of weights, e.g., weights W(1) to W(M). Access point 125, via its DSP engine 620, optimizes the set of weights W(1) to W(M). For example, if antenna A(I) provides the better data or signal, then the data from antenna A(I) is amplified with a higher weight W(I). However, if antenna A(J) does not provide a good signal, then the signal from antenna A(J) is attenuated with a lower or even negative weight W(J). In one embodiment, access point 125 uses the adaptive algorithm to optimize a set of weights even thought there are various ways to optimize the weights, and each optimization way is within the scope of the invention.

Figure 8:
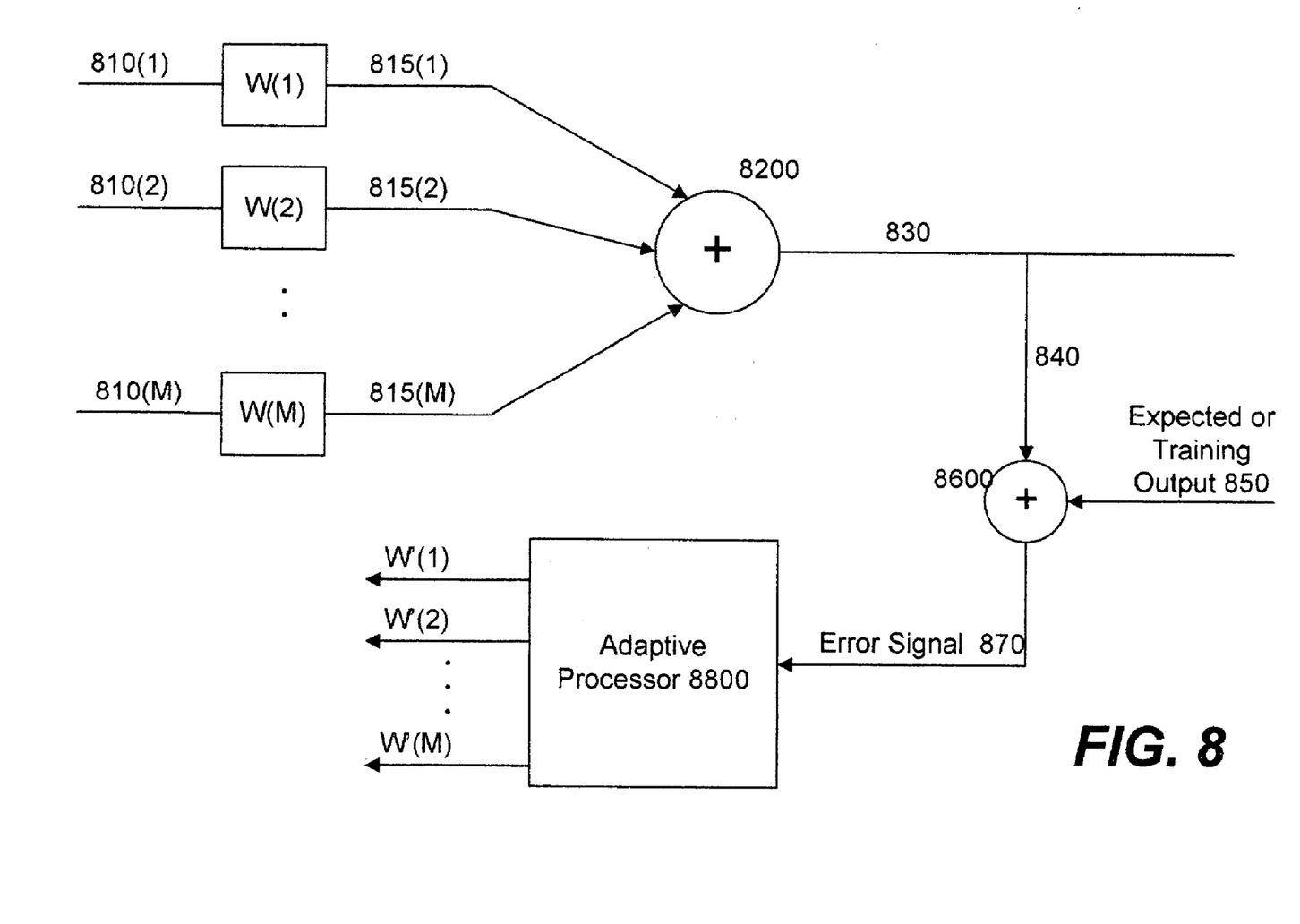
FIG. 8 illustrates an adaptive algorithm providing a set of adaptive weights in accordance with one embodiment.

Referring to FIG. 8 for an illustration of an adaptive algorithm providing a set of adaptive weights, in accordance with one embodiment. As discussed above, each RF sub unit 2200 uses one antenna to receive or transmit a data packet from or to a mobile station 130. Each line 810(1) to line 810(M) corresponds to an antenna A(1) to antenna A(M) or a RF sub unit 2200(1) to sub unit 2200(M), and a weight W(1) to weight W(M). Weights W are normally in the form of a complex number a+bi, and the amplitude of a weight W is the square root of $a^2+b^2$. The signal on each line 810(1) to 810(M) is multiplied by each corresponding weight W(1) to W(M), resulting in the data on line 815(1) to 815(M). Sum operation 8200 sums the weighted signals on line 815(1) to 815(M) and provides the outputs on line 830. The data on line 830 is inverted to become the data on line 840. The data on line 850 is the expected or training output. Sum operation 8600, having the inputs on line 840 and line 850, provides the error data on line 870, which is used by the adaptive processor 8800 to provide a new set of adaptive weights W'(1) to W'(M). In one embodiment, the data on line 810 and the expected data on line 850 arrive in a sequence of data units such as bits, bytes, or words. In this embodiment, the error data on line 870 includes the error corresponding to each data unit of the data on lines 810 and 850. The accumulative error is the total error of all the corresponding data units.

Method for Selecting an Optimum Set of Antennas

Figure 9:
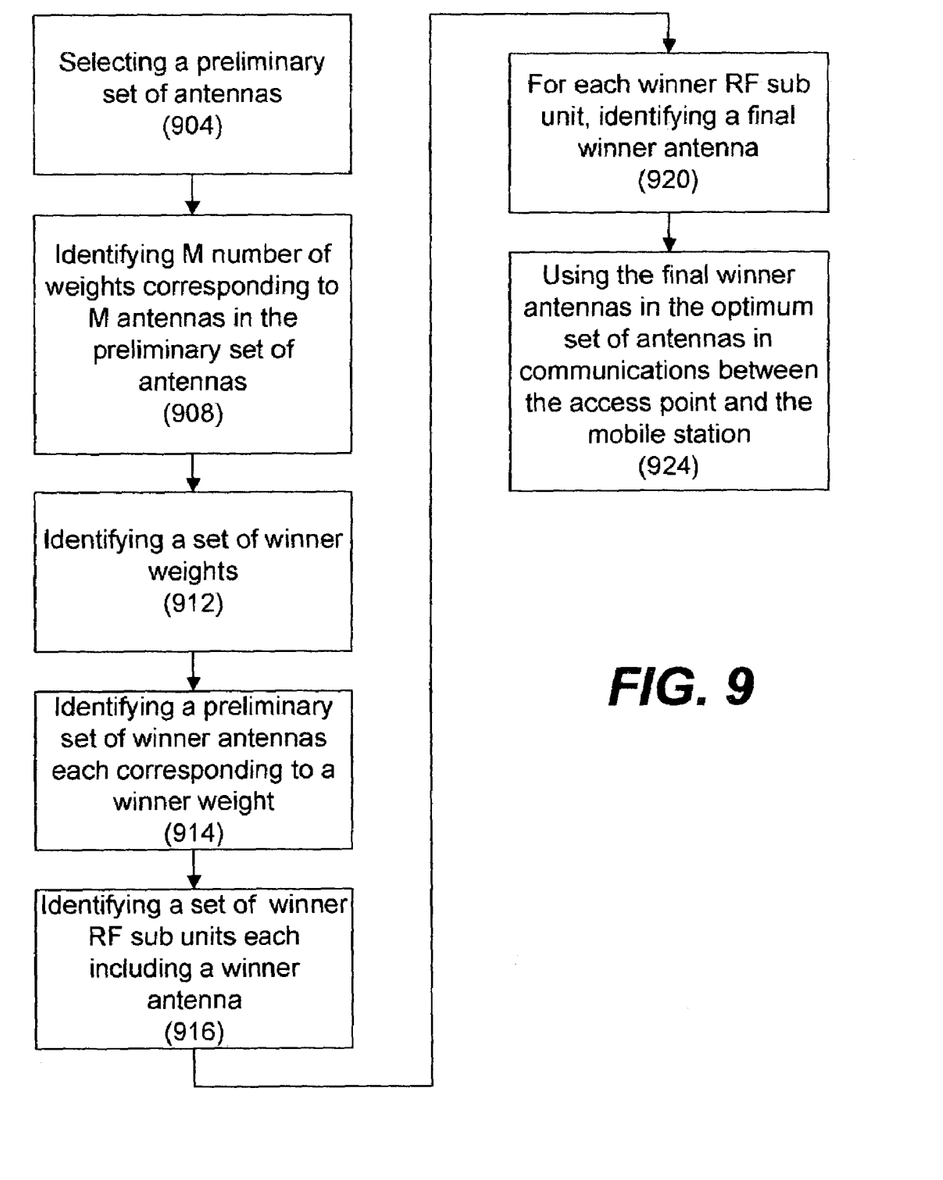
FIG. 9 is a flowchart illustrating a method for selecting a set of antennas for use in communications between an access point and a mobile station in accordance with one embodiment.

FIG. 9 is a flowchart illustrating a method for selecting a set of antennas for use in communicating between access point 125 and a mobile station 130, which, for illustration purposes, is station 130(1). This set of antennas may be referred to as the "optimum" set of antennas with respect to station 130(1) because the antennas in this set are selected in view of optimizing communications between access point 125 and station 130(1). In this example of FIG. 9, access point 125 includes M number of RF units 220, each unit 220 includes one sub unit 2200, and each sub unit 2200 includes K number of antennas, e.g., antenna 310(1) to 310(K).

In step 904, DSP engine 620 selects a preliminary set of antennas to communicate with station 130(1). This preliminary set of antennas includes one antenna from each RF sub unit 2200(1) to 2200(M) corresponding to each RF unit 220(1) to 220(M). In one embodiment, each antenna in each RF sub unit 2200 is randomly selected from its group of antennas 310(1) to 310(K). In an alternative embodiment, an antenna in the middle or near the middle of other antennas is selected. The invention is not limited to how antennas in the preliminary set of antennas are selected.

In step 908, engine 620 identifies a set of M number of weights corresponding to M number of antennas or M number of RF sub units 2200(1) to 2200(M). For illustration purposes, this set of weights includes weight W(1)(1) to weight W(1)(1) wherein the number in the first parenthesis corresponds to the number of the RF sub unit while the number in the second parenthesis corresponds to the number of the antenna. For example, weight W(I)(J) indicates that the weight W(I)(J) corresponds to RF sub unit 2200(I) and antenna 310(J) of that RF sub unit 2200(I).

In step 912, engine 620 identifies a set of "winner" weights each of which, in one embodiment, has an amplitude higher than a pre-defined threshold. The set of winner weights may include one or a plurality of winner weights.

In step 914, DSP engine 620 identifies the antenna that corresponds to a winner weight as a preliminary winner antenna. Engine 620 thus identifies a preliminary set of winner antennas corresponding to the set of winner weights. Each preliminary winner antenna is potentially a good candidate for use in communications between access point 125 and mobile station 130(1). For illustrative purposes, antennas in the preliminary set of antennas and not in the preliminary set of winner antennas are referred to as non-winner antennas. Normally, a winner antenna receives and transmits acceptable signals to mobile station 130(1), and a winner antenna is usually closer to mobile station 130(1) than a non-winner antenna. For further illustration purposes, there are two winner weights W(2)(4) and weight W(4)(1), which correspond to two antennas 310(1) of the two RF sub units 2200(2) and 2200(4), respectively.

In step 916, DSP engine 620 identifies a RF sub unit including a preliminary winner antenna as a winner RF sub unit. Engine 620 thus identifies a set of winner RF sub units corresponding to the set of preliminary winner antennas. In this example, the set of winner RF sub units includes units 2200(2) and 2200(4).

In step 920, for each RF sub unit 2200 in the set of winner sub units, engine 620 selects a final winner antenna in the group of antennas 310(1) to 310(K) connected to the corresponding winner RF unit. In each winner RF sub unit, the final winner antenna may be the same as preliminary winner antenna 310(1), or may be different from preliminary winner antenna 310(1). Engine 620 uses different methods to select a final winner antenna in a winner RF sub unit 2200. In one embodiment, the final winner antenna of a winner RF sub unit corresponds to a weight having the highest amplitude compared to other weights corresponding to other antennas in the same RF unit. In an alternative embodiment, the final winner antenna corresponds to a weight having the least cumulative adaptive error on line 870 in FIG. 8.

In step 924, DSP engine 620 uses the final winner antennas selected from the set of winner RF sub units in the optimum set of antennas for use in communications between access point 115 and mobile station 130(1). In one embodiment DSP engine 620 also uses the non-winner antennas in the optimum set of antennas.

Different Methods for Selecting a Final Winner Antenna in an RF Sub Unit

Figure 10:
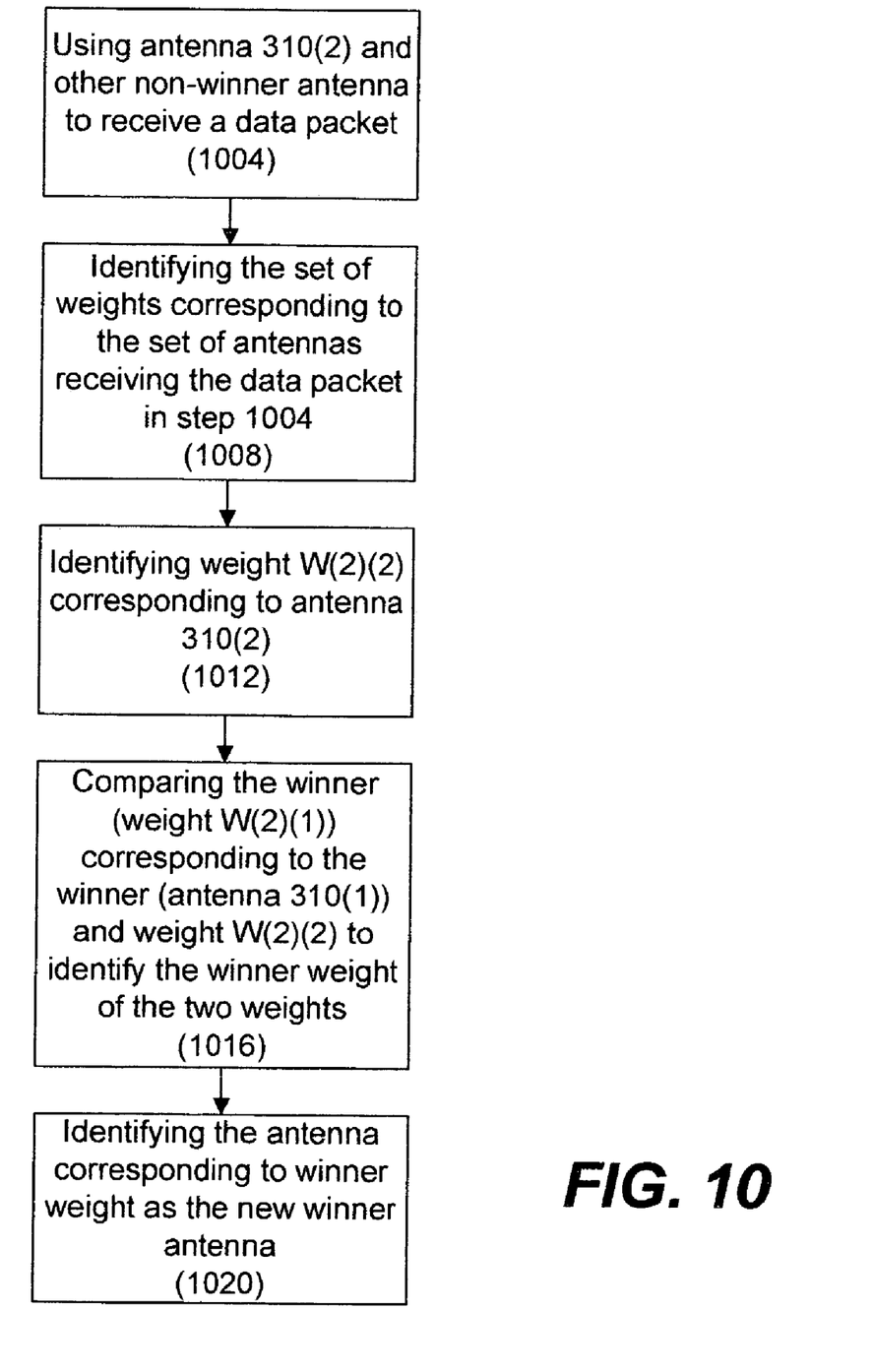
FIG. 10 is a flowchart illustrating a first method in selecting a final winner antenna in a winner radio-frequency sub unit, in accordance with one embodiment.

FIG. 10 is a flowchart illustrating a first method in selecting a final winner antenna in antenna 310(1) to antenna 310(K) in a winner RF sub unit, in accordance with one embodiment. In this FIG. 10, antenna 310(1) has been identified as a preliminary winner antenna. The following steps are performed for each antenna from the group of antennas 320(2) to 320(K). For illustration purposes, RF sub unit 2200(2) and an antenna 310(2) are used. At this point, weight W(2)(1) is the winner weight corresponding to antenna 310(1) of sub unit 2200(2).

In step 1004, via antenna 310(2) and other non-winner antennas of RF sub units 2200(1), 2200(3), . . . 2200(M) used in step 904 of FIG. 9, engine 620 receives a data packet from mobile station 130(1).

In step 1008, DSP engine 620, via an adaptive algorithm, provides the set of weights corresponding to the set of antennas receiving the data packet in step 1004.

In step 1012, DSP engine 620 identifies the weight, e.g., weight W(2)(2), corresponding to antenna 310(2).

In step 1016, to identify a new winner weight if such weight exists, engine 620 compares weight W(2)(2) to a previous winner weight, which originally at step 1004 is weight W(2)(1). In one embodiment, engine 620 selects the new winner weight as the one having a higher amplitude. For example, if weight W(2)(1) has a higher amplitude than weight W(2)(2), then engine 620 identifies weight W(2)(1) as the new winner weight. In contrast, if weight W(2)(2) has a higher amplitude, then engine 620 selects weight W(2)(2) as a new winner weight. In an alternative embodiment, engine 620 assigns a winner weight to the one that provides less accumulative error in FIG. 8.

In step 1020, DSP engine 620 identifies the antenna corresponding to the new winner weight in step 1016 as a new winner antenna.

By going through steps 1004 through 1020 for each antenna 310(2) through antenna 310(K) in a winner RF sub unit, DSP engine 620 identifies a final winner antenna in that RF sub unit. This final winner antenna corresponds to an adaptive weight having the highest amplitude and/or the least adaptive error as compared to other weights corresponding to other antennas in the same winner RF sub unit.

Figure 11:
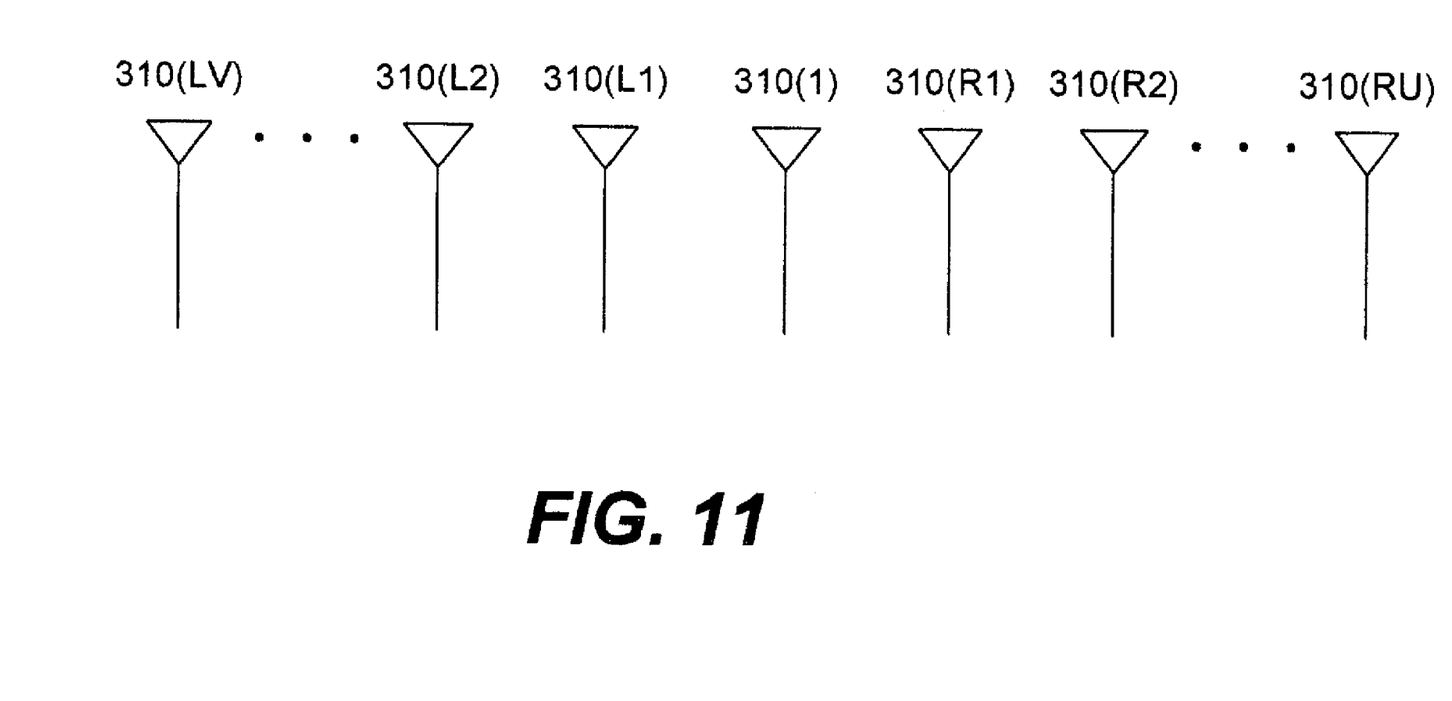
FIG. 11 is for use in illustrating a second method in selecting a final winner antenna in a winner radio-frequency sub unit, in accordance with one embodiment.

Referring to FIG. 11 for an illustration of the second method in selecting a final winner antenna in a winner RF sub unit 2200, in accordance with one embodiment. In this FIG. 11 example, antenna 310(1) is the preliminary winner antenna in a winner RF sub unit 2200 in FIG. 9. To the right of antenna 310(1) includes a "right" set of U antennas 310(R1), 310(R2), . . . 310(RU). Similarly, to the left of antenna 310(1) includes a "left" set of V antennas 310(L1), 310(L2), . . . 310(LV), etc. The number of antennas in the right set and in the left set may be different, but, in one embodiment, they are the same or substantially the same, depending on the total number of antennas existed in the same winner RF sub unit. For example, if the winner RF sub unit includes 11 antennas, then the total number of antennas for both the right and the left set is 10. Each right and left set thus includes 5 antennas. However, if the winner RF sub unit includes antennas, then the total number of antennas for both the right and the left set is 9. Each left or right set thus includes 4 or 5 antennas while the other set includes the rest, e.g., 5 or 4 antennas, respectively.

In one embodiment, DSP engine 620 uses the neighbors and the direction of the neighbors of preliminary winner antenna 310(1) to identify the final winner antenna in the RF unit associated with antenna 310(1). DSP engine 620 first searches for the final winner antenna in one direction, e.g., to the right, of antenna 310(1). DSP engine 620 thus searches in the right set of antennas. If the final winner antenna is not in the right set, then DSP engine 620 searches in the left set of antennas, and if the final winner antenna is not in the left set, then DSP engine 620 identifies the preliminary antenna as the final winner antenna.

In one embodiment, DSP engine identifies the winner antenna of the left set, the winner antenna of the right set, and, from these two winners and the preliminary winner antenna 310(1), identifies the final winner antenna.

In one embodiment, DSP engine 620 compares preliminary winner antenna 310(1) to its right-neighbor antenna, e.g., antenna 310(R1). If antenna 310(R1) becomes the winner antenna, then DSP compares winner antenna 310(R1) to its right neighbor, e.g., antenna 310(R2), and the comparison process continues to the right of antenna 310(R2) until a final winner antenna is selected. However, if antenna 310(1) remains the winner antenna, then DSP engine 620 compares the winner antenna 310(1) to its left neighbor, e.g., antenna 310(L1). If antenna 310(1) remains the winner antenna, then antenna 310(1) is selected as the final winner antenna. However, if antenna 310(L1) becomes the winner antenna, then DSP engine 620 compares winner antenna 310(L1) to its left antenna, e.g., antenna 310(L2), and the comparison process continues to the left of antenna 310(L2) until a final winner antenna is selected. For a further illustration of this embodiment, let antenna 310(L2) be the closet antenna to mobile station 130(1), and therefore DSP engine 620 finally selects antenna 310(L2) as the final winner antenna. In one embodiment, DSP engine 620 first compares antenna 310(1) to antenna 310(R1). Because, antenna 310(R1) is further away from mobile station 130(1) than antenna 310(1), antenna 310(1) remains the winner antenna. DSP engine 620 then compares antenna 310(1) to antenna 310(L1). Because antenna 310(L1) is closer to antenna 310(1), antenna 310(L1) becomes the winner antenna. DSP 620 next compares antenna 310(L1) to antenna 310(L2), which becomes the winner antenna because antenna 310(L2) is closer to station 130(1) than antenna 310(L1). DSP 620 then compares antenna 310(L2) to 310(L3). Because antenna 310(L2) is closer to mobile station 130(1), antenna 310(L3) remains the winner antenna or and thus is selected as the final winner antenna.

In the illustration of FIG. 11, the invention is not limited to selecting a right-neighbor antenna or a left-neighbor antenna first. Selecting the left-neighbor or the right-neighbor first can be random. Further, in selecting the final winner antenna, DSP engine 620 determines a winner antenna by comparing the winner weights as discussed above.

For example, DSP engine 620 forms a set of antennas, receives a data packet via the selected set of antennas, adapts a set of weights corresponding to the set of antennas, selects the winner weight among the various weights, identifies the winner antenna corresponding to the winner weight, etc. This embodiment works efficiently in situations where the final winner antenna is closest to the mobile station 130(1), and the closer an antenna to mobile station 130(1), the better the data communicated between the antenna (or the access point 125) with mobile station 130(1). The better data in turns translates into the corresponding weight having a higher amplitude or a less cumulative error, etc.

In the foregoing, the invention has been described with reference to various embodiments. However, those skilled in the art will recognize that the invention is not limited to those embodiments; variations and modifications may be made without departing from the scope of the invention; and the specification including the drawings is to be regarded as illustrative rather than as restrictive.

What is claimed is:

1. A method for selecting a set of antennas for use in a wireless communication system, comprising the steps of:
   providing a plurality of radio-frequency sub units each connecting to a plurality of antennas;
   using an antenna in each radio-frequency sub unit of the plurality of radio-frequency sub units to form a preliminary set of antennas;
   in the preliminary set of antennas, identifying a set of preliminary winner antennas and a set of non-winner antennas; each preliminary winner antenna being distinct from each non-winner antenna;
   from the set of preliminary winner antennas, identifying a set of winner radio-frequency sub units each including a preliminary winner antenna;
   from each winner radio-frequency sub unit, identifying a final antenna in the plurality of antennas connected to the winner radio-frequency sub unit; and
   using the final winner antenna from each winner radio-frequency sub unit to form the selected set of antennas.

2. The method of claim 1 further comprising the step of including at least one antenna in the set of non-winner antennas in the selected set of antennas.

3. The method of claim 1 wherein the plurality of radio-frequency sub units is connected to one another in one or a combination of series and parallel manner.

4. The method of claim 1 wherein the step of identifying the set of preliminary winner antennas comprising the step of selecting a preliminary winner antenna that provides data acceptable for use in the wireless communication system.

5. The method of claim 1 wherein the step of identifying the set of preliminary winner antenna comprising the step of identifying a mobile station communicating with an access point through the set of preliminary antennas, and selecting a preliminary winner antenna closer to the mobile station than a non-winner antenna.

6. The method of claim 1 wherein the step of identifying the set of preliminary winner antennas comprising the step of selecting a preliminary winner antenna corresponding to an adaptive weight having an amplitude higher than a threshold.

7. The method of claim 1 wherein the step of identifying the set of winner radio-frequency sub units comprising the step of identifying a winner radio-frequency sub unit that includes a preliminary winner antenna corresponding to an adaptive weight having an amplitude higher than a threshold.

8. The method of claim 1 wherein the step of identifying the final winner antenna in each winner radio-frequency sub unit comprising the steps of:
   identifying a mobile station communicating with an access point through the set of preliminary antennas, and
   identifying, as the final winner antenna, an antenna closest to the mobile station as compared to other antennas connected to the winner radio-frequency sub unit.

9. The method of claim 1 wherein the step of identifying the final winner antenna in each winner radio-frequency sub unit comprising the step of identifying an antenna that corresponds to an adaptive weight having the highest amplitude as compared to other weights that correspond to other antennas connected to the same winner radio-frequency sub unit.

10. The method of claim 1 wherein the step of identifying the final winner antenna in each winner radio-frequency sub unit comprising the step of identifying an antenna corresponding to an adaptive weight having the least adaptive error as compared to other adaptive weights that correspond to other antennas connected to the same winner radio-frequency sub unit.

11. The method of claim 1 wherein the step of identifying the final winner antenna in each radio-frequency sub unit comprising the steps of:
   identifying a right winner antenna in a right set of antennas to the right of the preliminary winner antenna in each radio-frequency sub unit and a left winner antenna in a left set of antennas to the left of the preliminary winner antenna in each radio-frequency sub unit, and
   identifying the final winner antenna among the right winner antenna, the left winner antenna, and the preliminary winner antenna in each radio-frequency sub unit.

12. An access point for use in a wireless communication system, comprising:
   a plurality of radio-frequency sub units each connecting to a plurality of antennas;
   a baseband unit connecting to the plurality of radio-frequency sub units, and a set of final antennas in the plurality of antennas of the plurality of the radio-frequency sub units, for communicating with a mobile station;

wherein the baseband unit including a smart-antenna engine for identifying an antenna in each radio-frequency sub unit of the plurality of radio-frequency sub units to form a preliminary set of antennas;

identifying a set of adaptive weights each corresponding to an antenna in the preliminary set of antennas;

identifying a set of winner weights in the set of adaptive weights; each winner weight corresponding to a winner antenna;

identifying a set of winner radio-frequency sub units each connecting to a winner antenna;

from each winner radio-frequency sub unit, identifying an antenna in the plurality of antennas connected to the each winner radio-frequency sub unit as a final winner antenna; and including the final winner antenna in each winner radio-frequency sub unit in the set of final antennas for communicating with the particular mobile station.

13. The access point of claim 12 wherein a winner weight in the set of adaptive weights having an amplitude higher than a threshold.

14. The access point of claim 12 wherein the final winner antenna in a winner radio-frequency sub unit corresponds to an adaptive weight selected from one or a combination of a weight having the highest amplitude as compared to other weights corresponding to other antennas in the same winner radio-frequency sub unit and a weight having the least adaptive error as compared to other weights corresponding to other antennas in the same winner radio-frequency sub unit.

* * * * *